US006400098B1

(12) United States Patent
Pun

(10) Patent No.: US 6,400,098 B1
(45) Date of Patent: Jun. 4, 2002

(54) COMPACT FLUORESCENT LAMP DIMMERS

(75) Inventor: King Kwok Pun, Kowloon (HK)

(73) Assignee: Sonlex Limited, Kowloon (HK)

( * ) Notice: Subject to any disclaimer, the term of this patent is extended or adjusted under 35 U.S.C. 154(b) by 0 days.

(21) Appl. No.: 09/934,063

(22) Filed: Aug. 21, 2001

(51) Int. Cl.[7] .............................................. H05B 41/16
(52) U.S. Cl. ...................... 315/287; 315/360; 323/905
(58) Field of Search ................. 361/18, 93.2; 315/360, 315/91, 287; 323/905, 237, 238, 241, 244

(56) References Cited

U.S. PATENT DOCUMENTS 4,713,601 A * 12/1987 Zahm et al. ................. 323/322
5,539,281 A * 7/1996 Shackle et al. .......... 315/209 R
6,191,563 B1 2/2001 Bangerter .................... 323/211
6,208,122 B1 3/2001 Yuan ........................... 323/237
6,211,624 B1 4/2001 Holzer ........................ 315/224
6,218,787 B1 4/2001 Murcko et al. ............. 315/194
6,222,325 B1 4/2001 Wuidart et al. ............. 315/209
6,225,759 B1 5/2001 Bogdan et al. ............. 315/291
6,229,271 B1 5/2001 Liu ............................. 315/291

* cited by examiner

Primary Examiner—Shawn Riley
(74) Attorney, Agent, or Firm—Alix, Yale & Ristas, LLP

(57) ABSTRACT

A dimmer for controlling AC power to a lighting load provides a leading power factor by initiating conduction through an electronic switch at each zero crossing of the line current. The dimmer delivers current to the lighting load in a sequence of pulses where each pulse corresponds to a portion of one AC half wave. A variable resistance that alters a voltage signal delivered to an integrated circuit permits the user to determine the duration of each pulse and thus vary the power delivered to the lighting load. The dimmer is provided with over current protection.

10 Claims, 2 Drawing Sheets

COMPACT FLUORESCENT LAMP DIMMERS

BACKGROUND OF THE INVENTION

1. Field of the Invention

This invention relates to the control of power supplied to a fluorescent light fixture to achieve variable light output and, more particularly, to the control of AC power delivered to a compact fluorescent light fixture having an electronic ballast.

2. Description of the Related Art

Dimmable lights are desirable in many applications including the home, office, theater, etc. Dimmable lights permit the light intensity in a particular space to be varied to suit the immediate purpose for that room. Various methods of achieving variable light levels have evolved over the years. Many of these methods are based on the principle that the illumination intensity of a lighting load will vary proportionally to the amount of power delivered to the load.

The most common prior art systems consist of AC power regulating circuits in which AC power to a load is regulated through control of an electronic switch (e.g., a thyristor, a triac or SCR) interconnecting the source of AC power and the load. These systems typically vary the amount of power delivered to the load by advancing or retarding the time relative to a zero crossing that the electronic switch is triggered into conduction during each half cycle of the AC power cycle. Thus, the device is turned on later in the cycle to reduce power and earlier to increase power. Once activated, the electronic switch typically turns off automatically when the current through the device drops to zero, thereby blocking current to the load when the supply current reverses direction. To decrease or increase power to the load, the trigger phase angle is advanced or retarded and the portion of each half wave of AC input power that is applied to the load through the switch is thereby decreased or increased. These common prior art AC power control circuits are also referred to as phase control dimmers.

This type of power regulation circuit results in conduction occurring primarily during the later part of each half cycle of the AC power. The negative effects of these circuits include:

1. an inductive (lagging) power factor;
2. harmonic distortion;
3. noise spikes reflected into the power line; and
4. decreased power line efficiency.

Such lagging power factors frequently result in increased electric utility rates to the user. Because current does not flow from the AC source during the time the electric switch is off, substantial harmonic distortion and noise is reflected into the power line which can interfere with the operation of sensitive electronic equipment. In addition, current from the AC power line to the load is interrupted during a substantial portion of each AC half cycle, which can result in large surge currents. Large surge currents can cause ballast temperature to rise excessively, causing early failure or actual breakdown with acrid smoke generation.

The problems just described with reference to the most common prior art dimming circuits make them incompatible with many compact fluorescent light fixtures. The ballasts of compact fluorescent lamps are known as reactive loads, i.e., loads that resist rapidly changing currents. Most such fluorescent fixtures are labeled "non-dimmable".

While fluorescent light fixtures have been commonly used to light large spaces, i.e., offices and warehouses, many residential light fixtures are configured around the incandescent bulb. Homeowners enjoy the warm light, low cost, dimmability and compact size of incandescent light fixtures.

Two trends are converging to increase the use of compact fluorescent lamps configured to directly replace incandescent light bulbs. First, the drawbacks associated with fluorescent light fixtures, e.g., cold-looking light, blinking, awkward sizes and high-pitched noise, have largely disappeared. Modern compact fluorescent light bulbs are convenient, reliable and configured to fit most lamps and fixtures. Second, as electricity becomes more expensive, the efficiency inherent in a fluorescent lamp becomes more important. The most common form of compact fluorescent lamps incorporate "non-dimmable" ballasts.

Many attempts have been made to produce a dimmable fluorescent light fixture. Most prior art dimmable fluorescent fixtures incorporate complex ballasts that react to a control signal to increase or reduce the power provided to the magnetic ballast. Electronic ballasts are also available which work essentially on the same principle. More expensive "dimmable" electronic ballasts are also available. Complex and/or electronic ballasts may be appropriate for light fixtures in which the fluorescent lamp itself is replaced independently of the ballast. However, in most compact fluorescent lamps, the ballast is manufactured as part of the lamp. Dimmable electronic ballasts increase the cost of each compact fluorescent lamp because the expensive ballast is disposed with each used compact fluorescent lamp.

There is a need in the art to provide an alternative form of AC power control that is compatible with a "non-dimmable" compact fluorescent lamp. Such an AC power control should ideally be compatible with all compact fluorescent and incandescent lamps.

SUMMARY OF THE INVENTION

One embodiment of a dimmer for compact fluorescent lamps in accordance with the present invention comprises an electronic circuit including a zero-cross detector used to trigger an electronic switch to provide pulses of alternating current to the compact fluorescent lamp. The dimmer includes a current-sensing circuit to limit the amount of current applied to the compact fluorescent lamp. A low-pass filter suppresses switching noise produced by the electronic switch and smooths the flow of current to the ballast of a compact fluorescent lamp.

A dimmer in accordance with the present invention is a direct replacement for the conventional phase-control dimmer switch, requiring no additional wiring. A variable resistance (rheostat) permits the user to adjust the duration of each current pulse. Long current pulses deliver more power to the ballast of the compact fluorescent lamp and result in a brighter light, while shorter current pulses deliver less power and result in less light output.

The dimmer provides a leading power factor by initializing conduction at the zero crossing. Initializing conduction at the zero crossing of each AC half cycle allows current to build gradually in the ballast. This prevents large surge currents and damage to the ballast.

It is an object of the present invention to provide a new and improved dimmer that is compatible with "non-dimmable" ballast compact fluorescent lamps.

Another object of the present invention is to provide a new and improved dimmer for compact fluorescent lamps that does not require special wiring or complicated installation.

A further object of the present invention is to provide a new and improved dimmer for compact fluorescent lamps that is of low cost and efficient construction.

These and other objects, features and advantages of the invention will become readily apparent to those skilled in the art upon reading the description of the preferred embodiments, in conjunction with the accompanying drawings.

DETAILED DESCRIPTION OF THE PREFERRED EMBODIMENTS

Figure 1:
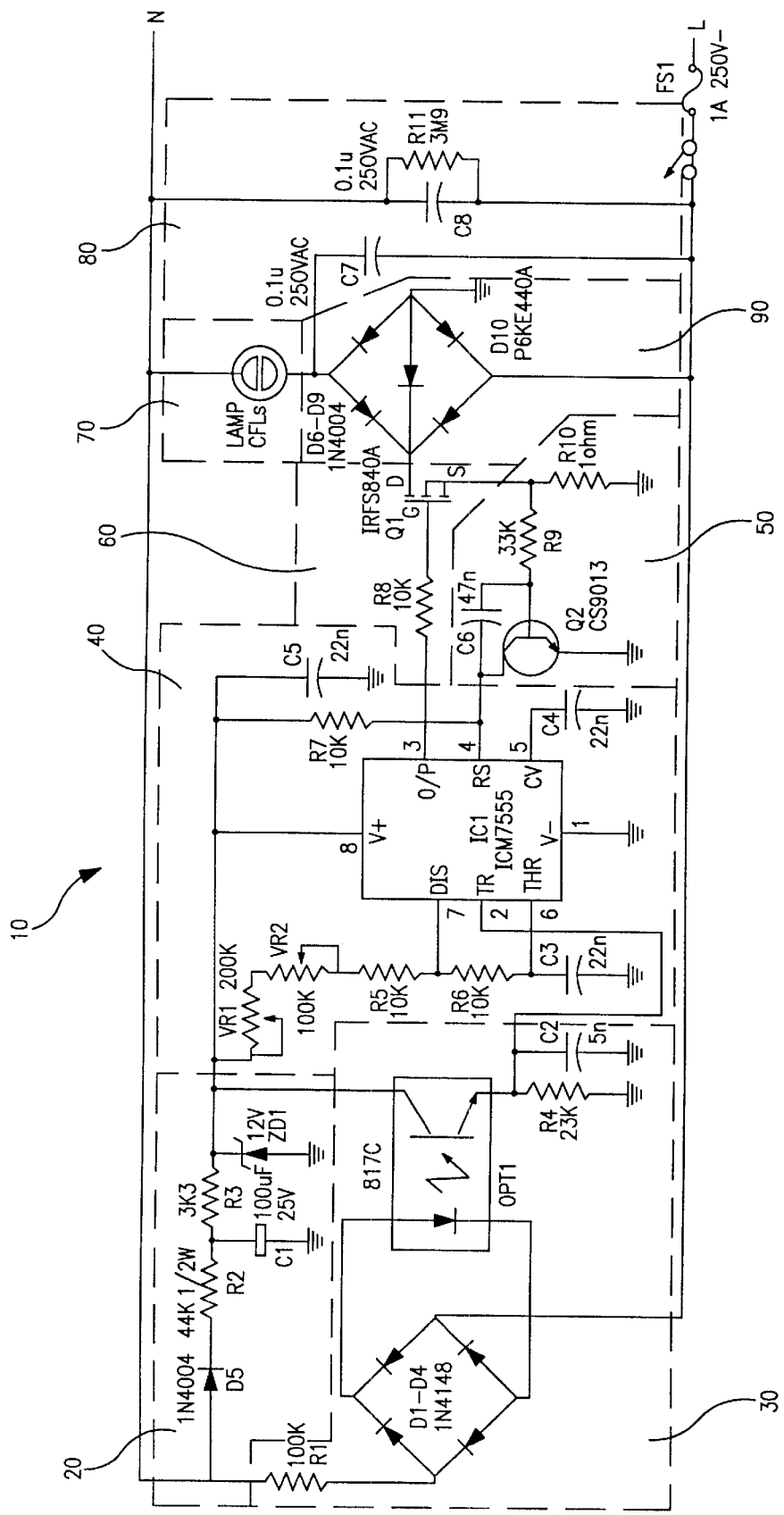
FIG. 1 is a schematic diagram of a dimmer for compact fluorescent lamps in accordance with the present invention.

With reference to the drawings, wherein like numerals refer to like parts throughout the figures, FIG. 1 is a schematic of a dimmer for fluorescent lamps in accordance with the present invention which is generally designated by the numeral 10. The circuit for dimmer 10 includes a power supply 20, a zero cross detector 30, a pulse width modulator 40, over-current protection 50, solid state switch 60, a diode bridge 90, and low pass filter 80 arranged to vary the supply of AC power to compact fluorescent lamp 70.

Diode D5, resistors R2 and R3, capacitor C1, and zener diode ZD1 define a simple voltage supply 20. The voltage supply provides 20 regulated 12 volt direct current (DC) to the electronic components of the dimmer 10.

The zero cross detector 30 includes a step-down resistor R1 that feeds line voltage through diodes D1–D4. Diodes D1–D4 are connected so that the rising current portion of each AC half wave is delivered to opto coupler OPT1. The output of OPT1 is shaped through a resistance capacitance network R4, C2 and fed to the trigger (pin 2) of a low power general-purpose timer IC1.

Upon receipt of a trigger signal, pin 3 of IC1 goes high and through resistor R8 turns on MOSFET switch Q1. A conductive MOSFET switch Q1 permits supply current to flow through the diode bridge 90 (D6–D9) and the compact fluorescent lamp 70. A variable voltage applied to IC1 at pin 7 determines the duration for which output pin 3 will be held high allowing MOSFET switch Q1 to conduct. Depending on the voltage applied at pin 7, MOSFET switch Q1 will conduct for between 10% and 100% of each AC half-cycle. Thus, variable resistances VR1, VR2 and timer IC1 act in conjunction with MOSFET switch Q1 to apply current pulses of variable duration to the ballast of compact fluorescent lamp 70.

Figure 2:
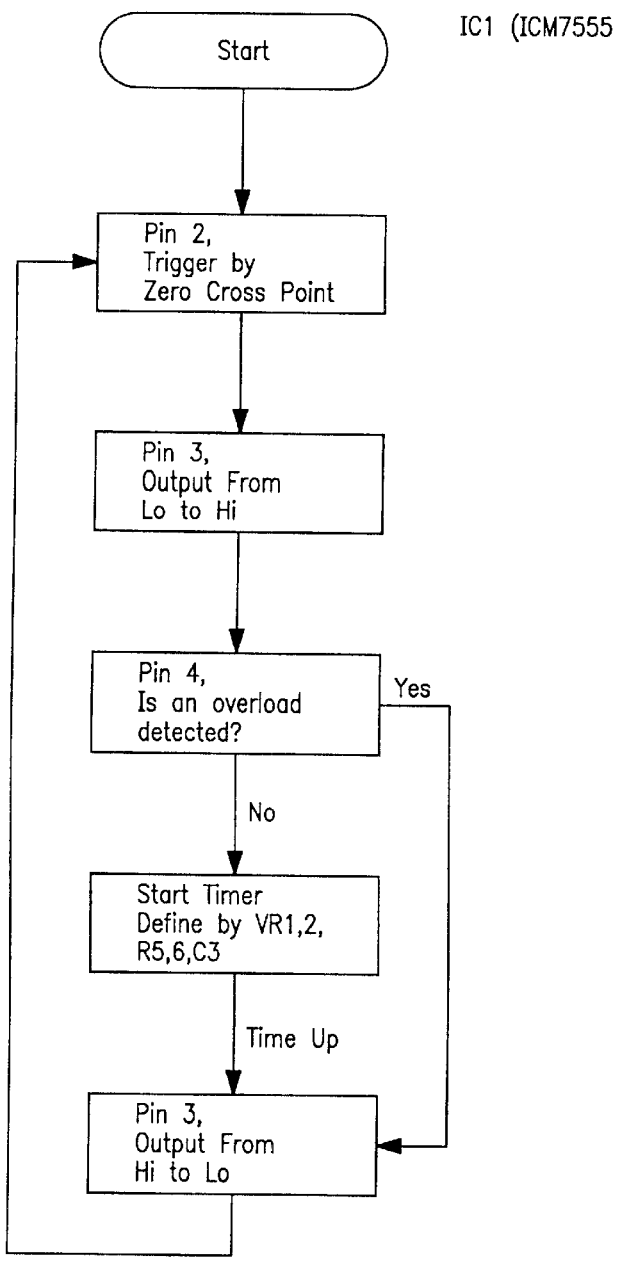
FIG. 2 is a logic flow chart for the circuitry producing an output at IC1 pin 3.

FIG. 2 is a logic flow chart of the circuitry for producing variable length pulses at pin 3 of IC1. The zero cross trigger signal produced by zero cross detector 30 is input to IC1 at pin 2. Upon receipt of the trigger signal at pin 2, IC1 causes O/P pin 3 to go high. The circuit is responsive to an overload signal generated by over current detection circuit 50 to immediately cause O/P pin 3 to go low. If no over current is detected, IC1 utilizes variable voltage input at pin 7 to determine the length of the current pulse. A resistance capacitance network including variable resistances VR1, VR2, fixed resistances R5, R6 and capacitor C3 produce the variable voltage. IC1 is preferably a ICM7555 timer chip which responds to the input at pin 7 to hold pin 3 high for a length of time corresponding to the value of the variable voltage. When the time set by the value of the variable voltage expires, IC1 causes O/P pin 3 to go low.

Figure 3:
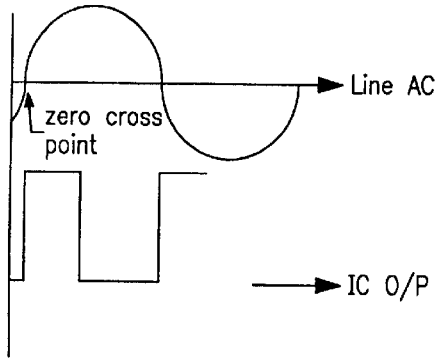
FIG. 3 illustrates the output of IC1, pin 3 compared to line AC.

This circuit produces an IC O/P at pin 3 as illustrated in FIG. 3. FIG. 3 illustrates the relationship between the AC line current and the O/P at pin 3. Pin 3 goes high at the beginning of each AC half wave. A high at pin 3 turns on MOSFET switch 60 through R8. A low at pin 3 turns off MOSFET switch 60 through R8. It is by this means that variable length pulses of line current are delivered to the ballast of the compact fluorescent lamp.

The dimmer is provided with an over current detection circuit comprising transistor Q2, sensing resistor R10 and pull up resistor R7. Pin 4 of IC1 is normally held high by pull up resistor R7. Q2 remains off or non-conductive until current flow through resistor R10 raises the 5 voltage at the base of transistor Q2 to approximately .7V. When a pre-established current (approximately 1 Amp.) flows through R10, transistor Q2 is turned on pulling pin 4 of IC1 low. A low input at pin 4 causes IC1 to turn off MOSFET switch Q1 by reducing the output at pin 3 to a low voltage.

Capacitors C7 and C8 in conjunction with resistor R11 form a low pass filter to suppress switching noise produced by MOSFET switch Q1 and stabilize the flow of current through the ballast of compact fluorescent light lamp 70.

The illustrated embodiment of a dimmer for compact fluorescent lamp 10 overcomes the deficiencies of the prior art by providing power to the compact fluorescent lamp (or other lighting load) having a leading power factor. This is accomplished by providing the first portion of each AC half-wave to the ballast of the compact fluorescent lamp. Current during the first half of each AC half wave builds more slowly in the inductive magnetic ballast, thereby preventing sudden surge currents and overheating of the ballast. The low pass filter 80 further stabilizes the flow of current through the compact fluorescent lamp. By providing variable AC power that is compatible with the magnetic ballast of common compact fluorescent lamps, the dimmer for compact fluorescent lamps 10 eliminates the need for special wiring, transmitters and receivers that were required by the prior art.

While preferred embodiments of the foregoing invention have been set forth for purposes of illustration, the foregoing description should not be deemed a limitation of the invention herein. Accordingly, various modifications, adaptations, and alternatives may occur to one skilled in the art without departing from the spirit and the scope of the invention.

What is claimed is:

1. A dimmer for control of AC power delivered to a lighting load, said AC power comprising a continuous stream of alternating positive and negative going half waves, said dimmer comprising:

zero cross detecting means for detecting a supply current change of direction and generating a trigger signal corresponding to each said change of direction;

voltage divider means for generating an adjustable voltage signal, said voltage divider means comprising a resistance voltage divider network including at least one variable resistance where a magnitude of said adjustable voltage signal is responsive to variation of said variable resistance;

over current detection means for detecting current flow through the lighting load and generating an over current signal in response to current flow in excess of a pre-established maximum;

electronic switch means for delivering a pulse of AC current corresponding to a portion of each said half wave to the lighting load; and integrated circuit means for initiating and terminating current flow through said electronic switch means, wherein said integrated circuit means is responsive to each said trigger signal to initiate current flow through said electronic switch means, said integrated circuit means is responsive to a value of said adjustable voltage signal to terminate current flow through said electronic switch means so that each pulse of alternating current has a duration corresponding to the magnitude of said adjustable voltage signal and said integrated circuit means is responsive to said over current signal to terminate current flow through said electronic switch means.

2. The dimmer of claim 1, further comprising low pass filter means for stabilizing current flow through said lighting load.

3. The dimmer of claim 1, wherein said integrated circuit means comprises a low power general purpose timer.

4. The dimmer of claim 1, wherein said electronic switch means comprises a MOSFET.

5. The dimmer of claim 1, wherein each AC half wave has a duration and the duration of each said pulse of AC current delivered to said lighting load through said electronic switch is adjustable from 10% to 100% of the duration of each said AC half wave.

6. A dimmer for control of AC power delivered to a lighting load, said AC power comprising a continuous stream of alternating positive and negative going half waves, each half wave beginning with a change of line current direction, said dimmer comprising:

an electronic switch that delivers pulses of line current to said lighting load, each said pulse of line current having a duration;

an over current detection circuit that generates an over current signal in response to current flow through said electronic switch in excess of a pre-established maximum;

a variable resistance that produces a variable voltage signal; and an integrated circuit comprising a timer chip that generates an output for turning on and turning off said electronic switch to produce said pulses of line current, wherein said output is synchronized with the change of line current direction so that said pulses of line current coincide with an initial portion of each said positive and negative going half waves and said integrated circuit is responsive to said over current signal to turn off said electronic switch and said integrated circuit is responsive to said variable voltage signal to vary the duration of said pulses of line current.

7. The dimmer of claim 6 wherein said electronic switch comprises a MOSFET.

8. The dimmer of claim 6, further comprising low pass filter means for smoothing the flow of current to said lighting load.

9. The dimmer of claim 6, wherein said integrated circuit comprises a low power general purpose timer.

10. The dimmer of claim 6, wherein each AC half wave has a duration and the duration of each said pulse of line current delivered to said lighting load is adjustable from 10% to 100% of the duration of each said AC half wave in response to changes in said variable voltage signal.

* * * * *